United States Patent
Song et al.

(10) Patent No.: US 9,197,988 B2
(45) Date of Patent: Nov. 24, 2015

(54) METHOD AND APPARATUS FOR CONTROLLING FEMTOCELL BASE STATION

(71) Applicant: Electronics and Telecommunications Research Institute, Daejeon (KR)

(72) Inventors: Jae Su Song, Daejeon (KR); Yunhee Cho, Daejeon (KR); Seung-Hwan Lee, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 276 days.

(21) Appl. No.: 13/677,665

(22) Filed: Nov. 15, 2012

(65) Prior Publication Data

US 2013/0260786 A1 Oct. 3, 2013

(30) Foreign Application Priority Data

Mar. 28, 2012 (KR) ........................ 10-2012-0031660

(51) Int. Cl.
  *H04B 17/00* (2015.01)
  *H04W 4/00* (2009.01)
  *H04W 36/00* (2009.01)
  *H04W 72/00* (2009.01)
  (Continued)

(52) U.S. Cl.
  CPC ................ *H04W 4/02* (2013.01); *H04W 16/32* (2013.01); *H04W 16/16* (2013.01); *H04W 84/045* (2013.01)

(58) Field of Classification Search
  CPC ....... H04W 64/00; H04W 4/02; H04W 24/00; H04W 28/04; H04W 28/18; H04L 29/08657; H04B 17/0085; H04B 17/004; H04B 17/0042; H01Q 3/267

USPC ............ 455/456.1, 452.2, 67.14, 67.11, 509, 455/444, 435.1, 422.1, 414.1, 436; 370/335, 344

See application file for complete search history.

(56) References Cited

U.S. PATENT DOCUMENTS 7,929,970 B1 * 4/2011 Gunasekara et al. ......... 455/444
8,417,238 B2 * 4/2013 Jang ........................... 455/422.1

(Continued)

FOREIGN PATENT DOCUMENTS

KR 1020090105666 10/2009
KR 1020100066898 6/2010

(Continued)

*Primary Examiner* — William D Cumming
(74) *Attorney, Agent, or Firm* — Nelson Mullins Riley & Scarborough LLP; Anthony A. Laurentano, Esq.; Lewis Lee, Esq.

(57) ABSTRACT

A method and an apparatus for controlling a femtocell base station which can effectively solve an inter-cell interference problem. A method of controlling a femtocell base station according to an exemplary embodiment includes receiving pilot signals from one or more macro cell base stations located in surroundings of a femtocell and measuring intensities of pilot signals, receiving use frequency information and pilot signal transmission power information from one or more macro cell base stations, determining a position of a femtocell within a reference macro cell according to an intensity of a reference pilot signal having a maximum signal intensity among received pilot signals, determining a use frequency of a femtocell according to a position of a femtocell, and determining a transmission power of a femtocell according to use frequency and an intensity of a reference pilot signal of a femtocell.

10 Claims, 4 Drawing Sheets

(51) Int. Cl.
*H04W 24/00* (2009.01)
*H04W 4/02* (2009.01)
*H04W 16/32* (2009.01)
*H04W 16/16* (2009.01)
*H04W 84/04* (2009.01)

(56) References Cited

U.S. PATENT DOCUMENTS

| | | | | |
|---|---|---|---|---|
| 8,548,504 | B2* | 10/2013 | Jang et al. | 455/456.3 |
| 8,700,046 | B2* | 4/2014 | Ebiko et al. | 455/449 |
| 9,078,138 | B2* | 7/2015 | Andrews et al. | 1/1 |
| 2010/0124930 | A1* | 5/2010 | Andrews et al. | 455/436 |
| 2010/0238905 | A1* | 9/2010 | Hamabe et al. | 370/335 |
| 2010/0240386 | A1* | 9/2010 | Hamabe et al. | 455/452.2 |
| 2010/0248735 | A1* | 9/2010 | Hamabe et al. | 455/452.2 |
| 2011/0003557 | A1* | 1/2011 | Morita et al. | 455/67.11 |
| 2011/0003559 | A1* | 1/2011 | Morita et al. | 455/67.14 |
| 2011/0009147 | A1* | 1/2011 | Morita et al. | 455/509 |
| 2011/0117913 | A1* | 5/2011 | Masuda et al. | 455/435.1 |
| 2011/0268101 | A1* | 11/2011 | Wang et al. | 370/344 |
| 2011/0306324 | A1* | 12/2011 | Jang et al. | 455/414.1 |
| 2012/0135743 | A1* | 5/2012 | Ebiko et al. | 455/452.2 |
| 2012/0157084 | A1* | 6/2012 | Jang | 455/422.1 |
| 2013/0260786 | A1* | 10/2013 | SONG et al. | 455/456.1 |

FOREIGN PATENT DOCUMENTS

| | | |
|---|---|---|
| KR | 1020110030456 | 3/2011 |
| KR | 1020110057905 | 6/2011 |
| WO | 2009/140311 A2 | 11/2009 |

* cited by examiner

METHOD AND APPARATUS FOR CONTROLLING FEMTOCELL BASE STATION

CROSS-REFERENCE TO RELATED APPLICATIONS

This application is based on and claims priority from Korean Patent Application No. 10-2012-0031660, filed on Mar. 28, 2012, with the Korean Intellectual Property Office, the disclosure of which is incorporated herein in its entirety by reference.

TECHNICAL FIELD

The present disclosure relates to a method and an apparatus for controlling a femtocell base station for inter-cell interference mitigation in a mobile communication network environment where a macro cell and a femtocell coexist.

BACKGROUND

A femtocell refers to a subminiature home base station connected with a mobile communication service provider network through an IP by using a wired Internet (xDSL/Cable) line as a base station line, and corresponds to a cell for providing voice and data services to 4-8 users. A first advantage of the femtocell allows a radio quality within the home to be improved, stably provide the data service, and reduce loads of a macro cell by absorbing voice and data traffic generated at home since the femtocell is a type which has a dedicated base station installed in every home. Accordingly, it is possible to increase the base station line and reduce a maintenance cost by utilizing a wired infra within the home widely distributed. As a second advantage, it is possible to provide a new fixed mobile substitution (FMS) solution corresponding to a fixed mobile convergence (FMC) based on a wired service provider. That is, there is no limitation in a terminal unlike an FMC service in a dual mode due to the use of a mobile communication frequency, and there is no effect on the macro cell even through a use amount within the home is increased unlike a conventional FMS scheme.

However, the femtocell has a technical problem to solve an interference problem caused between the macro cell and the femtocell as well as including the above mentioned advantages. FIG. 1 is a view for describing an interference phenomenon generated between the macro cell and the femtocell.

As illustrated in FIG. 1, two areas are defined within the femtocell, the two areas corresponding to a femtocell coverage area in which a pilot signal intensity of the femtocell is larger than a pilot signal intensity of the macro cell and a macro cell dead zone in which the pilot signal intensity of the femtocell is larger than the pilot signal intensity of the macro cell by a predetermined value or more (for example, 4 dB in a WCDMA).

A terminal cannot access the macro cell in the macro cell dead zone. Since the pilot signal intensity of the macro cell becomes smaller as it is closer to a cell boundary area of the macro cell, a size of the dead zone becomes larger. A terminal located in the boundary area of the macro cell transmits a radio wave with very high power in order to access the macro cell, but the radio wave causes interference with the femtocell. This interference corresponds to interference due to an uplink. That is, large mutual interference between the macro cell and the femtocell is generated in the femtocell located in the boundary area of the macro cell, so that a phone communication quality is deteriorated.

It is difficult to form a femtocell coverage in a cell center area of the macro cell since the signal intensity of the macro cell is very large. Accordingly, a service of the femtocell itself is very difficult.

The related art to solve such an interference problem proposes a method through a power control of the femtocell and a method of allocating a different frequency used in the femtocell from that of the macro cell. However, the power control method has a limitation in mitigating inter-cell interference because the power control method is limited to a static method, and the method of allocating only a different frequency to the femtocell has a problem of deteriorating frequency use efficiency and frequently generating a call disconnection phenomenon when a handover between the macro cell and the femtocell is performed.

SUMMARY

The present disclosure has been made in an effort to solve the above mentioned problem and provide a method and an apparatus for controlling a femtocell base station which can effectively solve an inter-cell interference problem through a dynamic power control according to a position of the femtocell within a macro cell and an allocation of at least a different frequency.

An exemplary embodiment of the present disclosure provides a method of controlling a femtocell base station, the method including: receiving pilot signals from one or more macro cell base stations located in surroundings of a femtocell and measuring intensities of the pilot signals; receiving use frequency information and pilot signal transmission power information from the one or more macro cell base stations; determining a position of the femtocell within a reference macro cell according to an intensity of a reference pilot signal having a maximum signal intensity among the received pilot signals; determining a use frequency of the femtocell according to the position of the femtocell; and determining a transmission power of the femtocell according to the use frequency and the intensity of the reference pilot signal of the femtocell.

The determining of the position of the femtocell may include determining that the femtocell is located in a central area or a boundary area of the reference macro cell when the intensity of the reference pilot signal is smaller than or equal to a first set value or larger than a second set value, and determining that the femtocell is located in an intermediate area of the reference macro cell when the intensity of the reference pilot signal is larger than the first set value and smaller than or equal to the second set value.

The determining of the use frequency of the femtocell may include determining to allocate a frequency different from a use frequency of the reference macro cell when the femtocell is located in the central area or the boundary area of the reference macro cell and determining to allocate a frequency used in a macro cell having a minimum pilot signal intensity among other macro cells when frequencies different from the use frequency of the reference macro cell are all used in other macro cells, and determining to allocate an equal frequency to the use frequency of the reference macro cell when the femtocell is located in the intermediate area of the reference macro cell.

The determining of the transmission power of the femtocell may include determining to use maximum transmission power when the use frequency of the femtocell is different from the use frequency of the reference macro cell, and determining to use transmission power calculated by an equation of $$P_f = P_{f\_max} \frac{P_m(i)}{P_{m\_tx}(i)}$$

when the use frequency of the femtocell is equal to the use frequency of the reference macro cell, wherein $P_f$ denotes transmission power of the femtocell, $P_{f\_max}$ denotes maximum transmission power of the femtocell, $P_{m\_tx}(i)$ denotes pilot signal transmission power of the reference macro cell and $P_m(i)$ denotes the intensity of the received reference pilot signal.

According to the exemplary embodiments of the present disclosure, it is possible to significantly mitigate interference between the macro cell and the femtocell by distinguishing a position of the femtocell within the macro cell by using a pilot signal of the macro cell received by a femtocell base station and system information (a use frequency and pilot signal transmission power) and accordingly differently allocating the use frequency and the transmission power of the femtocell.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 2:
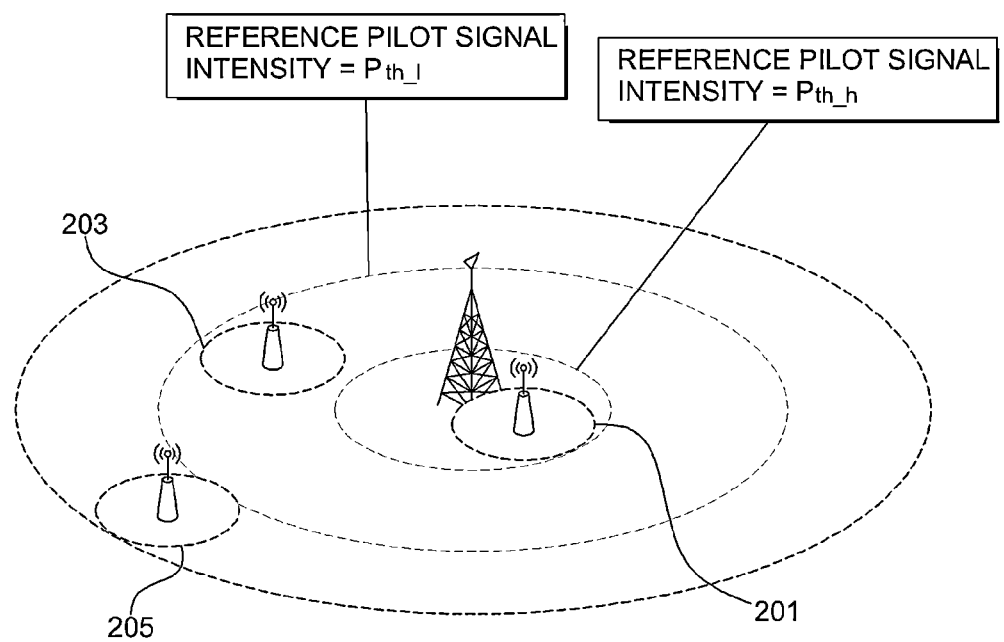
FIG. 2 is a diagram for schematically describing a method of controlling a femtocell base station according to the present disclosure.

FIG. 2 is a diagram for schematically describing a method of controlling a femtocell base station according to the present disclosure.

As illustrated in FIG. 2, the present disclosure uses a method of controlling a frequency and transmission power of the femtocell according to a relative position of the femtocell within a macro cell. That is, it is determined whether the femtocell is located in a boundary area 205 of the macro cell, an intermediate area 203, or a central area 201 based on a point where a pilot signal intensity of the macro cell measured by the femtocell base station is a first set value $P_{th\_l}$ and a point where the pilot signal intensity of the macro cell is a second set value $P_{th\_h}$, and a frequency and transmission power which can minimize interference with the macro cell are allocated to the femtocell according to the position of the femtocell. Hereinafter, a more detailed description will be made with reference to FIGS. 3 and 4.

Figure 3:
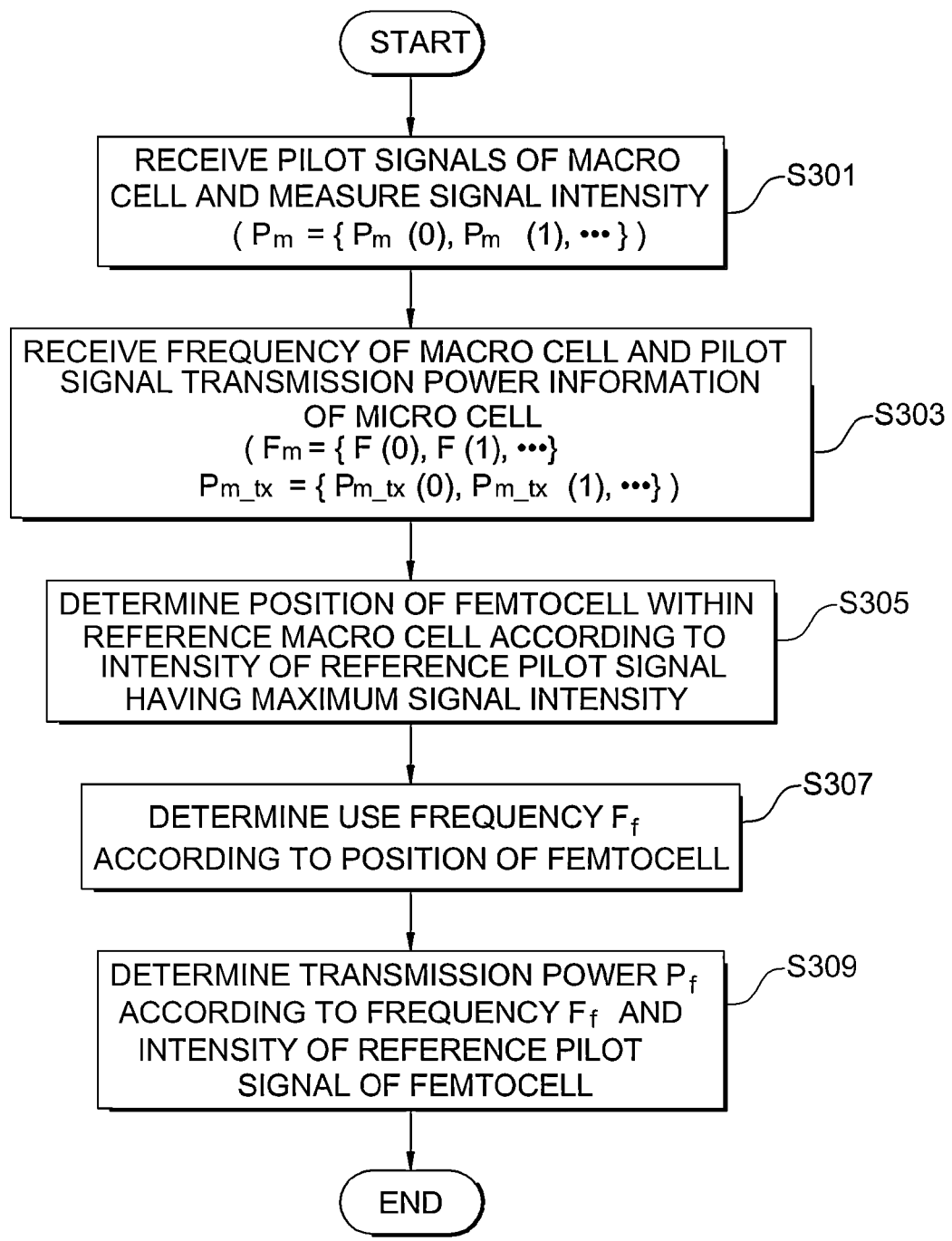
FIG. 3 is a flowchart illustrating a method of controlling a femtocell base station according to an exemplary embodiment of the present disclosure.

FIG. 3 is a flowchart illustrating a method of controlling a femtocell base station according to an exemplary embodiment of the present disclosure.

Referring to FIG. 3, the method of controlling the femtocell base station according to the exemplary embodiment of the present disclosure includes receiving a pilot signal of the macro cell and measuring a signal intensity in step S301, receiving a use frequency and pilot signal transmission power information of the macro cell in step S303, determining a position of the femtocell within a reference macro cell according to an intensity of a reference pilot signal having a maximum signal intensity among the received pilot signals in step S305, determining the use frequency according to the position of the femtocell in step S307, and determining the transmission power according to the use frequency and the intensity of the reference pilot signal of the femtocell in step S309.

In step S301, the pilot signal is received from one or more macro cell base stations located in surroundings of the femtocell, and the intensity of the signal is measured. The measured pilot signal intensity of the macro cell is expressed as $P_m$ below. A number in brackets refers to the number of received pilot signals, that is, the number of macro cells located in the surroundings of the femtocell.

$$P_m = \{P_m(0), P_m(1), \ldots\}$$

Here, since a base station transmitting the signal having the maximum signal intensity among the received pilot signals is a base station of the macro cell in which the current femtocell is located, this signal is referred to as a reference pilot signal, and the macro cell transmitting the signal is referred to as a reference macro cell.

In step S303, the use frequency and the pilot signal transmission power information are received from one or more macro cell base stations. The information may be obtained by decoding a broadcast channel (BCH) transmitted by the macro cell base station. The use frequency and the pilot signal transmission power of the macro cell are expressed as $F_m$ and $P_{m\_tx}$ below, respectively.

$$F_m = \{F_m(0), F_m(1), \ldots\}$$

$$P_{m\_tx} = \{P_{m\_tx}(0), P_{m\_tx}(1), \ldots\}$$

In $P_m$, $F_m$ and $P_{m\_tx}$ above, the same number in brackets means information on the same macro cell.

Figure 4:
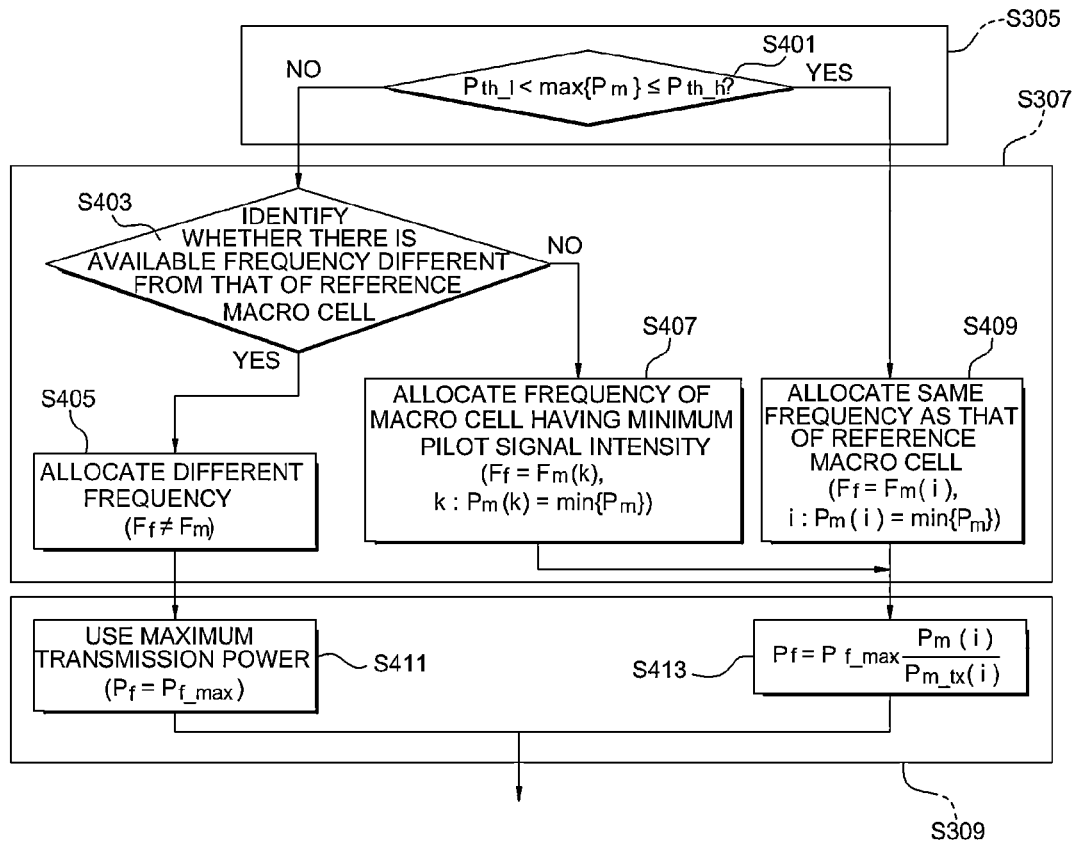
FIG. 4 is a flowchart illustrating in more detail a step of determining a use frequency and transmission power of a femtocell of FIG. 3.

FIG. 4 is a flowchart illustrating in more detail a step of determining the use frequency and the transmission power of the femtocell of FIG. 3. The frequency allocated to the femtocell is expressed as $F_f$ and the transmission power is expressed as $P_f$.

In step S305, when an intensity $\max\{P_m\}$ of the reference pilot signal is smaller than the first set value $P_{th\_l}$, it is determined that the femtocell is located in the boundary area (205 of FIG. 2) of the reference macro cell. When the intensity $\max\{P_m\}$ of the reference pilot signal is between the first set value $P_{th\_l}$ and the second set value $P_{th\_h}$, it is determined that the femtocell is located in the intermediate area (203 of FIG. 2). When the intensity $\max\{P_m\}$ of the reference pilot signal is larger than the second set value $P_{th\_h}$, it is determined that the femtocell is located in the central area (201 of FIG. 2) in step S401.

Since interference between the macro cell and the femtocell is high in the central area and the boundary area of the macro cell, it is good to allocate a frequency different from that of the macro cell to the femtocell if possible. In general, a mobile communication service provider can allocate a different frequency since he/she operates two to three frequency bands.

When it is determined that the femtocell is located in the central area or the boundary area of the reference macro cell in step S307, it is first determined whether there is a frequency which is not used by neighboring macro cells among frequencies different from the frequency of the reference macro cell in step S403. When there is the frequency which is not used, the frequency ($F_f \neq F_m$) is allocated to the femtocell in step S405. When all frequencies are used, a frequency used by a macro cell transmitting a signal having a minimum signal intensity among the received pilot signals, that is, a frequency ($F_f = F_m(k)$) of the macro cell corresponding to a value k from $P_m(k) = \min\{P_m\}$ is allocated to the femtocell in step S407.

When it is determined that the femtocell is located in the intermediate area of the reference macro cell, the same frequency as that of the reference macro cell, that is, $F_f = F_m(i)$, $P_m(i) = \max\{P_m\}$ is allocated to the femtocell in step S409.

In step S309, the transmission power $P_f$ of the femtocell may be determined according to two cases where the frequency of the femtocell is the same as and different from the frequency of the macro cell. In the case where the frequency of the femtocell is different from the frequency of the macro cell, there is no interference between the femtocell and the macro cell, so that maximum transmission power $P_{f\_max}$ is used in step S411. When the frequency of the femtocell is the same as the frequency of the macro cell, the transmission power $P_f$ of the femtocell is allocated to be inversely proportional to transmission power of the reference macro cell and to be proportional to the intensity of the reference pilot signal as follows.

$$P_f = P_{f\_max} \frac{P_m(i)}{P_{m\_tx}(i)}$$

$$(P_m(i) = \max\{P_m\})$$

Figure 1:
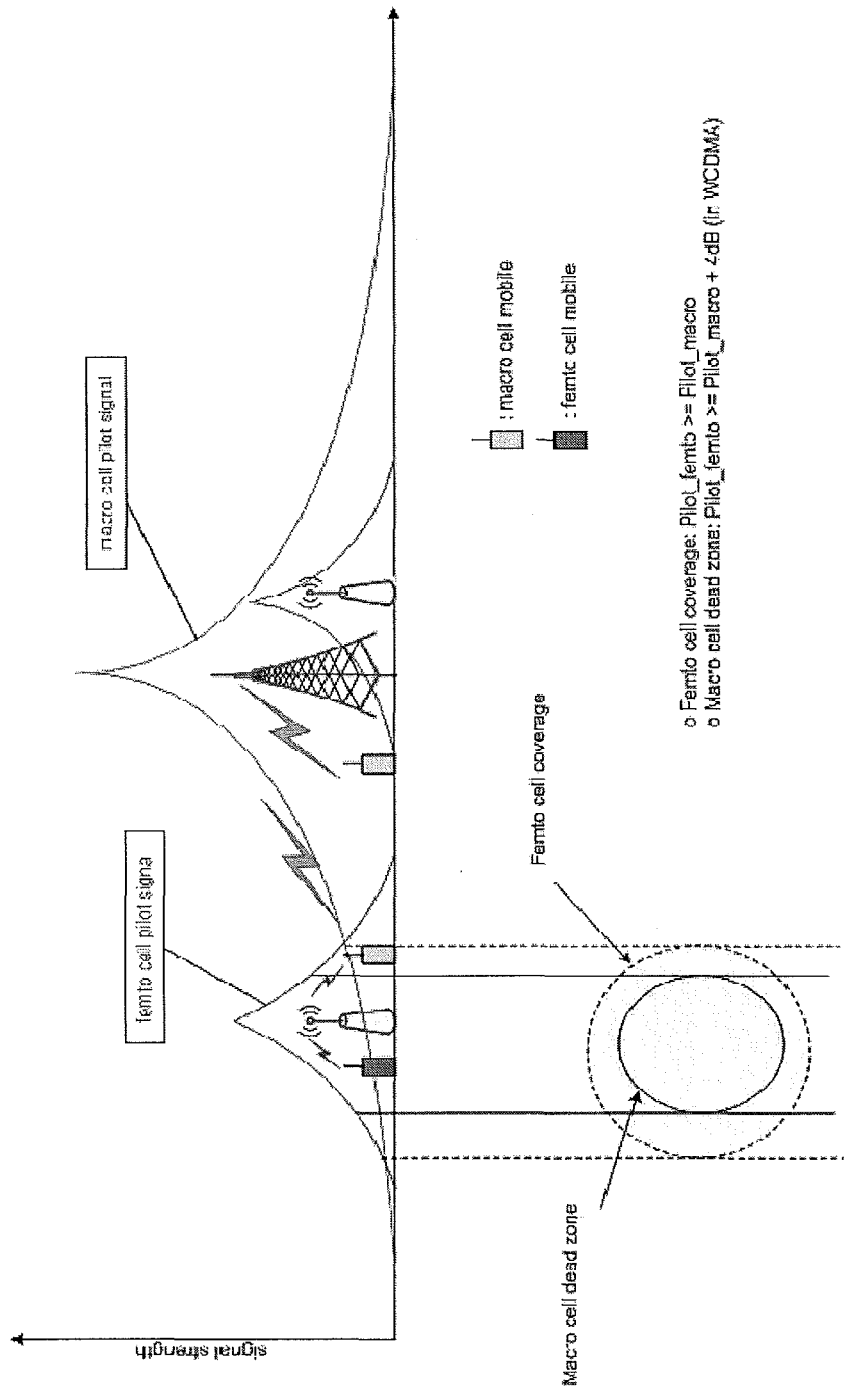
FIG. 1 is a diagram for describing an interference phenomenon between a macro cell and a femtocell.

This has an effect of reducing a size of the femtocell because the femtocell is closer to the boundary area from the central area of the macro cell. Accordingly, the macro cell dead zone (see FIG. 1) is also reduced.

Figure 5:
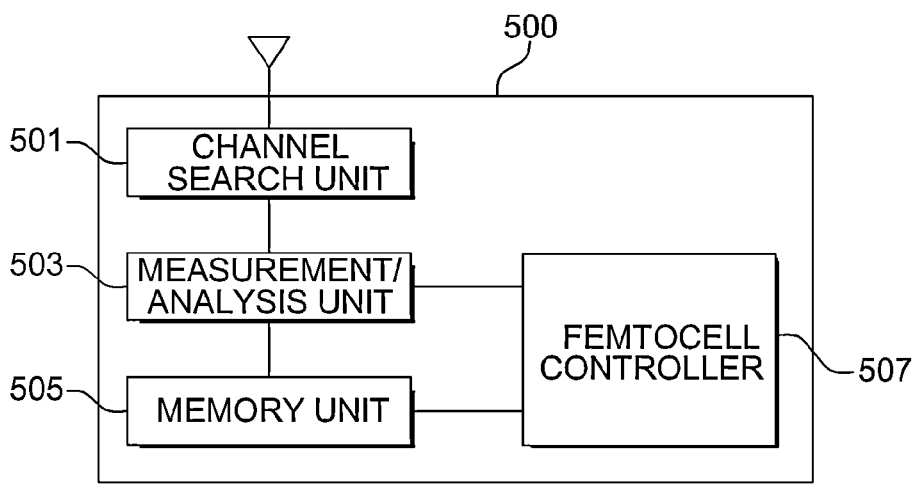
FIG. 5 is a configuration diagram of an apparatus for controlling a femtocell base station according to an exemplary embodiment of the present disclosure.

FIG. 5 is a configuration diagram of an apparatus for controlling a femtocell base station according to an exemplary embodiment of the present disclosure.

Referring to FIG. 5, the apparatus for controlling the femtocell base station 500 according to the exemplary embodiment of the present disclosure includes a channel search unit 501, a measurement/analysis unit 503, a memory unit 505, and a femtocell controller 507.

The channel search unit 501 searches for a pilot channel and a broadcast channel to receive a pilot signal, a use frequency and pilot signal transmission power information from one or more macro cell base stations located in surroundings of the femtocell.

In this case, since a plurality of macro cells may be searched in the boundary area of the macro cell, information on all the searched macro cells may be stored in the memory unit 505. The stored information may be used for determining the use frequency and the transmission power of the femtocell.

The measurement/analysis unit 503 measures an intensity of the received pilot signal, and determines a position of the femtocell within the reference macro cell according to the intensity of the reference pilot signal having a maximum signal intensity.

The femtocell controller 507 determines the use frequency and the transmission power of the femtocell according to the intensity of the reference pilot signal and the position of the femtocell.

A method of determining the position of the femtocell and a method of determining the use frequency and the transmission power are the same as those described through FIGS. 2 to 4 above.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of controlling a femtocell base station, comprising:
   receiving pilot signals from one or more macro cell base stations located in surroundings of a femtocell and measuring intensities of the pilot signals;
   receiving use frequency information and pilot signal transmission power information from the one or more macro cell base stations;
   determining a position of the femtocell within a reference macro cell according to an intensity of a reference pilot signal having a maximum signal intensity among the received pilot signals;
   determining a use frequency of the femtocell according to the position of the femtocell; and
   determining a transmission power of the femtocell according to the use frequency and the intensity of the reference pilot signal of the femtocell.

2. The method of claim 1, wherein the determining of the position of the femtocell comprises determining that the femtocell is located in a central area or a boundary area of the reference macro cell when the intensity of the reference pilot signal is smaller than or equal to a first set value or larger than a second set value, and determining that the femtocell is located in an intermediate area of the reference macro cell when the intensity of the reference pilot signal is larger than the first set value and smaller than or equal to the second set value.

3. The method of claim 2, wherein the determining of the use frequency of the femtocell comprises determining to allocate a frequency different from a use frequency of the reference macro cell when the femtocell is located in the central area or the boundary area of the reference macro cell and determining to allocate a frequency used in a macro cell having a minimum pilot signal intensity among other macro cells when frequencies different from the use frequency of the reference macro cell are all used in other macro cells.

4. The method of claim 2, wherein the determining of the use frequency of the femtocell comprises determining to allocate an equal frequency to the use frequency of the reference macro cell when the femtocell is located in the intermediate area of the reference macro cell.

5. The method of claim 2, wherein the determining of the transmission power of the femtocell comprises determining to use maximum transmission power when the use frequency of the femtocell is different from the use frequency of the reference macro cell.

6. The method of claim 2, wherein the determining of the transmission power of the femtocell comprises determining to use transmission power calculated by an equation of $$P_f = P_{f\_max} \frac{P_m(i)}{P_{m\_tx}(i)}$$

when the use frequency of the femtocell is equal to the use frequency of the reference macro cell, wherein $P_f$ denotes transmission power of the femtocell, $P_{f\_max}$ denotes maximum transmission power of the femtocell, $P_{m\_tx}(i)$ denotes pilot signal transmission power of the reference macro cell and $P_m(i)$ denotes the intensity of the received reference pilot signal.

7. An apparatus for controlling a femtocell base station, comprising:
 a channel search unit configured to search for a pilot channel and a broadcast channel to receive a pilot signal, a use frequency and pilot signal transmission power information from one or more macro cell base stations located in surroundings of the femtocell;
 a measurement/analysis unit configured to measure an intensity of the received pilot signal and determine a position of the femtocell within a reference macro cell according to the intensity of the reference pilot signal having a maximum signal intensity; and
 a femtocell controller configured to determine a use frequency and transmission power of the femtocell according to the intensity of the reference pilot signal and the position of the femtocell.

8. The apparatus of claim 7, wherein the measurement/analysis unit determines that the femtocell is located in a central area or a boundary area of the reference macro cell when the intensity of the reference pilot signal is smaller than or equal to a first set value or larger than a second set value, and determining that the femtocell is located in an intermediate area of the reference macro cell when the intensity of the reference pilot signal is larger than the first set value and smaller than or equal to the second set value.

9. The apparatus of claim 8, wherein the femtocell controller allocates a frequency different from a use frequency of the reference macro cell when the femtocell is located in the central area or the boundary area of the reference macro cell, but allocates a frequency used in a macro cell having a minimum pilot signal intensity among other macro cells when frequencies different from the use frequency of the reference macro cell are all used in other macro cells, and allocates an equal frequency to the use frequency of the reference macro cell when the femtocell is located in the intermediate area of the reference macro cell.

10. The apparatus of claim 8, wherein the femtocell controller uses maximum transmission power when the use frequency of the femtocell is different from the use frequency of the reference macro cell, and uses transmission power calculated by an equation of $$P_f = P_{f\_max} \frac{P_m(i)}{P_{m\_tx}(i)}$$

when the use frequency of the femtocell is equal to the use frequency of the reference macro cell, wherein $P_f$ denotes transmission power of the femtocell, $P_{f\_max}$ denotes maximum transmission power of the femtocell, $P_{m\_tx}(i)$ denotes pilot signal transmission power of the reference macro cell and $P_m(i)$ denotes the intensity of the received reference pilot signal.

* * * * *